United States Patent Office 3,345,317
Patented Oct. 3, 1967

3,345,317
EMULSION POLYMERIZATION OF TETRAFLUO-
ROETHYLENE USING TRIFLUOROTRICHLORO-
ETHANE AS EMULSION STABILIZER
Juzaemon Hoashi, Osaka-fu, Japan, assignor, by mesne
assignments, to Thiokol Chemical Corporation, Trenton, N.J., a corporation of Delaware
No Drawing. Filed Mar. 31, 1964, Ser. No. 356,034
Claims priority, application Japan, Apr. 4, 1963,
38/18,288
10 Claims. (Cl. 260—29.6)

This invention relates to the emulsion polymerization of fluoroolefins and, more particularly, to a process for the emulsion polymerization of tetrafluoroethylene to produce aqueous dispersions of the homopolymer or of various copolymers of tetrafluoroethylene and other fluoroolefins. The invention is based upon the discovery that trifluorotrichloroethane, when incorporated in an aqueous emulsion reaction medium containing the fluoroolefin, an amulsifying agent for the fluoroolefin, and a water-soluble catalyst system, is particularly effective in stabilizing the emulsion during the polymerization reaction. The invention provides an improved process for the emulsion polymerization of fluoroolefins, such as tetrafluoroethylene, hexafluoropropene, and trifluorochloroethylene, either by themselves or as comonomers, as well as an improved aqueous emulsion of a poly(tetrafluoroethylene) which may be further coagulated and subsequently employed in paste extrusion techniques.

The emulsion polymerization of tetrafluoroethylene, in which tetrafluoroethylene (either alone or with other fluoroolefin comonomers) is polymerized by emulsifying the monomer in an aqueous reaction medium containing an emulsifying agent for tetrafluoroethylene (and for the polymer) as well as a water-soluble catalyst system, yields best results when the emulsion is maintained without substantial coagulation of the polymer during the polymerization reaction. Many emulsion polymerization processes for producing aqueous dispersions of poly(tetrafluoroethylene) utilize small amounts of various high-boiling saturated hydrocarbons which are incorporated in the reaction medium as emulsion stabilizers. Although the use of these high-boiling saturated hydrocarbons, particularly those compounds which contain 12 or more carbon atoms, stabilizes the emulsion during the polymerization (or copolymerization, the terms being used herein interchangeably) of tetrafluoroethylene and doubtless contributes towards the stability of the aqueous dispersion of the polymer produced by the polymerization reaction, this technique imparts many deleterious properties to the polymer, particularly when it is prepared for use in paste extrusions. Because these saturated hydrocarbons possess high boiling points, it is difficult to volatilize the stabilizer during the coagulation of the aqueous dispersion of polymer to produce powder, which results in an increase in the time necessary to complete the coagulation. Any increase in the period for coagulation of the polymer dispersion usually results in the fibril formation on the surface of secondary particles of the polymer, which, in turn, necessitates the use of high extrusion pressures when these polymers are paste extruded since the polymer particles fail to aggregate easily.

Experience has also demonstrated that molded articles produced from aqueous poly(tetrafluoroethylene) dispersions which have been stabilized by saturated hydrocarbons frequently discolor during sintering due to the incomplete removal of the saturated hydrocarbon from the powder. Moreover, if these saturated hydrocarbon stabilizers contain even microquantities of olefins as trace impurities which are not completely removed prior to the polymerization reaction, even the trace amount of olefin copolymerizes with the tetrafluoroethylene and decreases the thermal stability of the resultant polymer.

Another disadvantage which has been observed in emulsion polymerizations of tetrafluoroethylene in which saturated hydrocarbons are employed as emulsion stabilizers is the tendency of these hydrocarbons to function as chain transfer agents, which, in turn, lowers the rate and degree of polymerization. To obviate this phenomenon, the polymerization must be carried out at relatively high pressures. By way of illustration, when a saturated hydrocarbon is used as the emulsion stabilizer, the emulsion polymerization of tetrafluoroethylene requires pressures of about 20 atmospheres and reaction periods between 60 and 70 hours to produce an aqueous dispersion of poly-tetrafluoroethylene containing 30 percent by weight of polymer solids.

Following an exhaustive investigation into the reaction conditions for the emulsion polymerization of tetrafluoroethylene, either as the sole monomer or as a comonomer with other fluoroolefins, such as hexafluoropropene and trifluorochloroethylene, it has been found that when a relatively small amount of trifluorotrichloroethane is incorporated in the reaction medium to stabilize the emulsion during the polymerization reaction, it is possible to achieve excellent stabilization of the emulsion during and after the polymerization reaction without obtaining any of the disadvantages which characterize the similar use of saturated hydrocarbons. Coagulation of aqueous poly(tetrafluoroethylene) dispersions which have been stabilized with trifluorotrichloroethane during the polymerization reaction yield polymer products which possess outstanding properties for use in paste extrusion techniques, requiring lower extrusion pressures than comparable polymers which had not been stabilized by the use of trifluorotrichloroethane during the polymerization reaction.

Based on these discoveries, the invention contemplates the improvement in a process for the emulsion polymerization of a fluoroolefin, in which the monomeric fluoroolefin is polymerized either alone or with other fluoroolefin comonomers in an aqueous emulsion reaction medium containing the fluoroolefin (or fluoroolefins), an emulsifying agent for the fluoroolefin, and a water-soluble catalyst system, which comprises incorporating a small amount of trifluorotrichloroethane in the reaction medium to stabilize the emulsion during the polymerization reaction.

Selection of an emulsifying agent for the emulsion polymerization (or copolymerization) of tetrafluoroethylene in accordance with the process of the invention may be made from any compound which is capable of functioning as an emulsifying agent for tetrafluoroethylene and the resultant aqueous dispersion of polymer. These compounds may be either linear or branched and are characterized by a high proportion of fluorine atoms in their molecular structure. Excellent results have been obtained by using emulsifying agents having a structure represented by the formulas $X(CF_2)_nCOOM$, $X(CF_2)_nSO_3M$ or $X(CF_2)_nCH_2OSO_3M$, in each of which formulas X may be either hydrogen, chlorine or fluorine, M may be an alkali metal or an ammonium group ($-NH_4$), and $n$ is a cardinal number from 6 to 12. Particularly satisfactory results have been obtained using the alkali metal and ammonium salts of ω-hydropolyfluorocarboxylic acids having the structure $$H(CF_2CF_2)_3COOH$$

and $H((CF_2CF_2)_4COOH$; perfluorocarboxylic acids having the structure $F(CF_2)_7COOH$ ω-chloropolyfluorocarboxylic acids having the structure $Cl(CF_2CF_2)_3COOH$ and $Cl(CF_2CF_2)_4COOH$; as well as the corresponding sulfonic (as opposed to carboxylic) acids. For optimum results, the concentration of emulsifying agent employed in the reaction mixture should be in the range from about 0.01 to about 10 percent by weight, based on the weight of the water contained in the reaction medium.

The particular catalyst system employed in the polymerization reaction is largely a matter of choice, and may be made from amongst the many free-radical catalysts or redox systems which are known and have been used to induce the polymerization of tetrafluoroethylene. Such catalyst systems, which are water-soluble, include $K_2S_2O_8/Na_2SO_3/AgNO_3$, $K_2S_2O_8/Na_2SO_3$, $(NH_4)_2S_2O_8$ or $K_2S_2O_8/NaHSO_4/FeSO_4$ to cite but a few. Only catalytic amounts of the water-soluble catalyst system (free radical or redox) are required.

The essence of the invention, however, is based on the use of trifluorotrichloroethane as the stabilizer for the emulsion. Oddly, the unique effects obtained by using trifluorotrichloroethane are not observed when other fluorochlorohydrocarbons are employed to stabilize the emulsion. Ethanes containing more or less fluorine atoms than trifluorotrichloroethane are virtually useless as emulsion stabilizers, the former (with more fluorine atoms) having low boiling points while the latter (with less fluorine atoms) cause chain transfer to occur. Similarly, none of the fluorochloromethanes have been found useful as emulsion stabilizers.

The trifluorotrichloroethane, which is preferably the isomer 1,1,2-trifluoro-1,2,2-trichloroethane, should be refined to remove any olefinic impurities prior to use in the process of the invention, since even microquantities of an olefinic impurity are sufficient to copolymerize with the tetrafluoroethylene and impair the thermal stability of the resultant polymer. Table I sets forth the physical properties of a series of polytetrafluoroethylene homopolymers which were prepared by identical emulsion polymerization techniques, using the same amount of 1,1,2-trifluoro-1,2,2-trichloroethane as the emulsion stabilizer but varying only the degree of purity of the trifluorotrichloroethane. Since the infrared absorption of trifluorotrichloroethane at $5.7\mu$ is a quantitative indicia of the amount of fluoroolefinic impurity contained in the compound, measurement of the infrared absorption of trifluorotrichloroethane at this wave length may be used to follow the effect of such impurities on the physical properties of polymer produced by emulsion polymerization of tetrafluoroethylene in accordance with the process of the invention. In each of these tests, the infrared spectrophotometric determination of trifluorotrichloroethane was made in a cell of 0.5 mm. thickness, using a base line drawn between shoulders which appeared at $5.6\mu$ and $5.93\mu$; the absorption at $5.7\mu$ was then obtained from this base line, and hence the values may be negative.

TABLE I.—RELATIONSHIP BETWEEN THE INFRARED ABSORPTION OF $C_2Cl_3F_3$ AT 5.7 MICRONS AND THE MOLECULAR WEIGHT AND PHYSICAL PROPERTIES OF THE POLYMER

| Absorption of $C_2Cl_3F_3$ at $5.7\mu$ | Polymer Properties | | |
|---|---|---|---|
| | M.W. ($10^6$) | Ultimate Strength (kg./mm.²) | Ultimate Elongation (Percent) |
| 0.046 | <1 | 1.20 | 39 |
| 0.026 | <1 | 1.15 | 20 |
| 0.006 | <1 | 1.22 | 195 |
| 0.002 | 2.2 | 2.09 | 485 |
| −0.003 | 10.0 | 1.89 | 320 |

As shown in Table I, when the trifluorotrichloroethane contains an appreciable amount (although still relatively small in total concentration) of olefinic impurities, the molecular weight and physical properties of the polytetrafluoroethylene are less than that obtained when the emulsion polymerization is carried out using trifluorotrichloroethane purified such that its infrared absorption at $5.7\mu$ reflects a low concentration of olefin impurity. Optimum results are obtained by using trifluorotrichloroethane previously purified such that its infrared absorption at $5.7\mu$, as determined by the aforementioned method, is less than 0.003.

To purify the trifluorotrichloroethane for use in the process of the invention, the commercial product should be passed through molecular sieves (5 A.) or treated with fuming sulfuric acid, both of which techniques eliminate most of the fluoroolefin impurities contained in the compound. When refined, trifluorotrichloroethane is a liquid at room temperature, with a specific gravity of 1.576 and a boiling point of 47.6° C. Generally, trifluorotrichloroethane is capable of stabilizing the emulsion during the polymerization reaction when used in concentrations in the range from about 1 to about 30 percent by weight, and preferably from about 15 to about 20 percent by weight, based on the weight of the water contained in the reaction medium.

To emulsion polymerize tetrafluoroethylene in accordance with the process of the invention, an aqueous reaction medium containing the emulsifying agent and trifluorotrichloroethane is charged to an autoclave fitted with an agitator, and the system purged with nitrogen gas to remove oxygen. Compressed tetrafluoroethylene is introduced into the autoclave, under agitation, until the internal pressure reaches from about 1 to about 10 atmospheres, and preferably in the range from about 6 to about 8 atmospheres, at which point a catalytic amount of the water-soluble catalyst system is added to the reaction medium, thereby emulsion polymerizing the tetrafluoroethylene to form an aqueous dispersion of the polymer. Although various polymerization temperatures may be used, it is desirable to maintain the temperature of the reaction medium in the range from room temperature to about 50° C., and preferably from about 30° C. to about 40° C., adding sufficient make-up tetrafluoroethylene to the reaction mixture to maintain the desired internal pressure.

Under these conditions and using trifluorotrichloroethane to stabilize the emulsion during the polymerization reaction, the extent to which chain transfer occurs is minimal, and consequently it is possible to complete the polymerization reaction without considerable diminution in the rate or degree of polymerization, at pressures from atmospheric to 10 atmospheres and generally in much less time than would be required were a saturated hydrocarbon employed as the emulsion stabilizer. Because trifluorotrichloroethane possesses a specific gravity close to that of the resultant emulsion, it is possible to achieve a polymer solids concentration of about 30 percent by weight (based on the total weight of the emulsion) in very short periods.

The polymerization reaction should be carried for a period of time sufficient to achieve a polymer solids concentration in the range from about 20 to about 65 percent by weight. The best practice is based on stopping the polymerization reaction when the solids concentration of polymer reaches from about 20 to about 35 percent by weight, and then coagulating the resultant aqueous dispersion to produce powder.

When the dispersed poly(tetrafluoroethylene) is coagulated from the emulsion by agitation, the trifluorotrichloroethane volatilizes readily because of its low boiling point and may be recovered and reused. Moreover, the poly(tetrafluoroethylene) particles appear to coagulate with a little fibril formation, yielding a product which requires low pressures for paste extrusion. Since the resultant product contains little trifluorotrichloroethane, there is no discoloration of the polymer powder particles during subsequent sintering.

The following example is illustrative of the ease with which tetrafluoroethylene may be emulsion polymerized in accordance with the process of the invention:

One and one-half liters of deionized water containing 0.9 percent by weight of $H(CF_2)_6COONH_4$ and 10 percent by weight of 1,1,2-trifluoro-1,2,2-trichloroethane were charged to a four-liter autoclave fitted with an agitator, and the system purged with nitrogen to remove all oxygen. The autoclave was then evacuated and tetrafluoroethylene introduced under pressure until the internal pressure in the autoclave reached 6 atmospheres. After raising the temperature of the aqueous reaction medium to 30° C., a water-soluble catalyst system of 0.01 percent by weight of ammonium persulfate, 0.0005 percent by weight of sodium acid sulfate and 2 p.p.m. of ferrous sulfate was added to the reaction medium, and the mixture agitated at a speed of 120 r.p.m., under which conditions the emulsion polymerization of tetrafluoroethylene occurred. During the polymerization, make-up tetrafluoroethylene was added to the autoclave to maintain a constant internal pressure of 6 atmospheres.

The polymerization reaction was stopped after about 30 hours, at which time the solids concentration of the polymer was about 30 percent by weight of the weight of the resultant aqueous dispersion. Any unreacted tetrafluoroethylene in the autoclave was recovered for further use. After the specific gravity of the emulsion was adjusted to 1.08, the polytetrafluoroethylene was coagulated by agitation, using a turbine type agitator, the total time for coagulation being only 10 minutes. The resultant powder was recovered from the liquid aqueous emulsion, and dried at 120° C.

Excellent results were also obtained when the example was repeated, using small amounts of polymerizable comonomeric fluoroolefins, such as hexafluoropropene and trifluorochloroethylene, in conjunction with tetrafluoroethylene. Moreover, when the reaction was repeated again using a reaction temperature of 40° C., the resultant emulsion contained 35 percent by weight of polymer solids 30 hours after the onset of polymerization. Furthermore, when $F(CF_2)_7COONH_4$ was used as the emulsifying agent instead of $H(CF_2)_8COONH_4$, all other factors being equal, an emulsion containing 35 percent by weight of polymer solids in about 30 hours of polymerization resulted.

By way of comparison, when cetane (a saturated hydrocarbon) was substituted for trifluorotrichloroethane as the emulsion stabilizer, using the identical reaction conditions described above, a reaction time of 75 hours was required to achieve a polytetrafluoroethylene solids concentration of 30 percent by weight, and this only by increasing the pressure to 20 atmospheres and using three times the amount of catalyst. Moreover, the coagulation of polytetrafluoroethylene from this emulsion required 40 minutes.

Further tests were conducted to compare the physical properties of polytetrafluoroethylene powder produced by conventional emulsion polymerization and by the process of the invention. Each polymer was subjected to an extrusion test which consisted of thoroughly mixing 100 parts by weight of the polytetrafluoroethylene and 25 parts by weight of white oil, following which the mixture was charged to a cylinder having a 30 mm. diameter with a 5 mm. die diameter. The cylinder was immersed in a water bath at 60° C. for 10 minutes, and the mixture was extruded at the rate of 17 mm. per minute, using a Universal Testing Machine RS-10 (manufactured by Shimazu Seisakusho Co.) and the extrusion pressure measured. In addition, the two polytetrafluoroethylene powders were sintered at 360° C., and any discoloration noted. The results of these tests are set forth below in Table II.

TABLE II.—COMPARISON OF TWO POLYTETRAFLUOROETHYLENE POWDERS PRODUCED BY EMULSION POLYMERIZATION

| Polytetrafluoroethylene | Extrusion (kg./cm.$^2$) | Properties | |
|---|---|---|---|
| | | Coloration After Sintering | Appearance of Extrusion |
| Process of invention | 24 | None | No cracks. |
| Conventional Process | 45 | Light brown | Some cracks. |

Although the foregoing example has demonstrated the advantages of using trifluorotrichloroethane as an emulsion stabilizer in the emulsion polymerization (or copolymerization) of tetrafluoroethylene in which a linear hydropolyfluoro- or perfluorocarboxylate was employed as the emulsifying agent, similar results may be obtained using and polyfluoro-substituted emulsifying agent for tetrafluoroethylene.

I claim:
1. In a process for the emulsion polymerization of tetrafluoroethylene, in which monomeric tetrafluoroethylene is polymerized in an aqueous emulsion reaction medium containing tetrafluoroethylene, an emulsifying agent for tetrafluoroethylene, and a water-soluble catalyst system, the improvement which consists essentially of incorporating from about 1 to about 30 percent by weight of highly purified trifluorotrichloroethane in the reaction medium to stabilize the emulsion during the polymerization reaction, the percentage of trifluorotrichloroethane added to the reaction medium being based on the weight of water contained in the reaction medium, the degree of purity of the trifluorotrichloroethane incorporated in the reaction medium being such that its infrared spectrophotometric absorption, as determined in a cell of 0.5 mm. thickness, at $5.7\mu$ is less than 0.003 when measured from a base line drawn between shoulders which appear at $5.6\mu$ and $5.93\mu$.

2. In a process for the emulsion polymerization of tetrafluoroethylene with another fluoroolefin, in which the comonomers are copolymerized in an aqueous emulsion reaction medium containing tetrafluoroethylene, at least one fluoroolefin comonomer selected from the group consisting of hexafluoropropene and trifluorochloroethylene, an emulsifying agent for the comonomers, and a water-soluble catalyst system, the improvement which consists essentially of incorporating from about 1 to about 30 percent by weight of highly purified trifluorotrichloroethane in the reaction medium to stabilize the emulsion during the polymerization reaction, the percentage of trifluorotrichloroethane added to the reaction medium being based on the weight of water contained in the reaction medium, the degree of purity of the trifluorotrichloroethane incorporated in the reaction medium being such that its infrared spectrophotometric absorption, as determined in a cell of 0.5 mm. thickness, at $5.7\mu$ is less than 0.003 when measured from a base line drawn between shoulders which appear at $5.6\mu$ and $5.93\mu$.

3. A process for the emulsion polymerization of tetrafluoroethylene which consists essentially of polymerizing tetrafluoroethylene by emulsifying the monomer in an aqueous reaction medium containing (a) a catalytic amount of a water-soluble catalytic system, (b) from about 1 to about 30 percent by weight of highly purified trifluorotrichloroethane having a degree of purity such that its infrared spectrophotometric absorption, as determined in a cell of 0.5 mm. thickness, at $5.7\mu$ is less than 0.003 when measured from a base line drawn between shoulders which appear at $5.6\mu$ and $5.93\mu$, and (c) from about 0.01 to about 10 percent by weight of an emulsifying agent having a structure selected from the group consisting of $X(CF_2)_nCOOM$, $X(CF_2)_nSO_3M$, and $$X(CF_2)_nCH_2OSO_3M$$

in which X is selected from the group consisting of hydrogen, chlorine and fluorine, M is selected from the group consisting of alkali metals and ammonia, and $n$ is a cardinal number in the range from 6 to 12, all percentages being based upon the weight of the water in the aqueous reaction medium.

4. A process for the emulsion polymerization of tetrafluoroethylene which consists essentially of polymerizing tetrafluoroethylene by emulsifying the monomer in an aqueous reaction medium containing (a) a catalytic amount of a water-soluble catalyst system, (b) from about 1 to about 30 percent by weight of highly purified trifluorotrichloroethane having a degree of purity such that its infrared spectrophotometric absorption, as determined in a cell of 0.5 mm. thickness, at $5.7\mu$ is less than 0.003 when measured from a base line drawn between shoulders which appear at $5.6\mu$ and $5.93\mu$, and (c) from about 0.01 to about 10 percent by weight of an emulsifying agent having a structure selected from the group consisting of $X(CF_2)_nCOOM$, $X(CF_2)_nSO_3M$, and $$X(CF_2)_nCH_2OSO_3M$$

in which X is selected from the group consisting of hydrogen, chlorine and fluorine, M is selected from the group consisting of alkali metals and ammonium, and $n$ is a cardinal number in the range from 6 to 12, at a temperature in the range from room temperature to about 50° C' and at a pressure in the range from about 1 to about 10 atmospheres for a period of time sufficient to achieve a solids concentration of polymer in the aqueous emulsion in the range from about 20 to about 65 percent by weight, all percentages except those designating the solids concentration of the polymer being based upon the weight of the water in the aqueous reaction medium.

5. A process for the emulsion polymerization of tetrafluoroethylene which consists essentially of polymerizing tetrafluoroethylene by emulsifying the monomer in an aqueous reaction medium containing (a) a catalytic amount of a water-soluble catalyst system, (b) from about 15 to about 20 percent by weight of highly purified 1,1,2-trifluoro-1,2,2-trichloroethane having a degree of purity such that its infrared spectrophotometric absorption, as determined in a cell of 0.5 mm. thickness, at $5.7\mu$ is less than 0.003 when measured from a base line drawn between shoulders which appear at $5.6\mu$ and $5.93\mu$, and (c) from about 0.01 to about 10 percent by weight of an emulsifying agent having a structure selected from the group consisting of $X(CF_2)_nCOOM$, $X(CF_2)_nSO_3M$, and $X(CF_2)_nCH_2OSO_3M$, in which X is selected from the group consisting of hydrogen, chlorine and fluorine, M is selected from the group consisting of alkali metals and ammonium, and $n$ is a cardinal number in the range from 6 to 12, at a temperature in the range from about 30° C. to about 40° C. and at a pressure in the range from about 6 to about 8 atmospheres for a period of time sufficient to achieve a solids concentration of polymer in the aqueous emulsion in the range from about 20 to about 35 percent by weight, all percentages except those designating the solids concentration of the polymer being based upon the weight of the water in the aqueous reaction medium.

6. A process for the emulsion polymerization of tetrafluoroethylene with a comonomeric fluoroolefin which consists essentially of polymerizing tetrafluoroethylene with at least one comonomer selected from the group consisting of hexafluoropropene and trifluorochloroethylene by emulsifying the comonomers in an aqueous reaction medium containing (a) a catalytic amount of a water-soluble catalyst system, (b) from about 15 to about 20 percent by weight of highly purified 1,1,2-trifluoro-1,2,2-trichloroethane having a degree of purity such that its infrared spectrophotometric absorption, as determined in a cell of 0.5 mm. thickness, at $5.7\mu$ is less than 0.003 when measured from a base line drawn between shoulders which appear at $5.6\mu$ and $5.93\mu$, and (c) from about 0.01 to about 10 percent by weight of an emulsifying agent having a structure selected from the group consisting of $X(CF_2)_nCOOM$, $X(CF_2)_nSO_3M$, and $$X(CF_2)_nCH_2OSO_3M$$

in which X is selected from the group consisting of hydrogen, chlorine and fluorine, M is selected from the group consisting of alkali metals and ammonium, and $n$ is a cardinal number in the range from 6 to 12, at a temperature in the range from about 30° C. to about 40° C. and at a pressure in the range from about 6 to about 8 atmospheres for a period of time sufficient to achieve a solids concentration of polymer in the aqueous emulsion in the range from about 20 to about 35 percent by weight, all percentages except those designating the solids concentration of the polymer being based upon the weight of the water in the aqueous reaction medium.

7. An aqueous emulsion of a poly(tetrafluoroethylene) consisting essentially of an aqueous dispersion of (a) from about 20 to about 65 percent by weight of a normally solid polymer of tetrafluoroethylene, (b) from about 1 to about 30 percent by weight of highly purified trifluorotrichloroethane having a degree of purity such that its infrared spectrophotometric absorption, as determined in a cell of 0.5 mm. thickness, at $5.7\mu$ is less than 0.003 when measured from a base line drawn between shoulders which appear at $5.6\mu$ and $5.93\mu$, and (c) from 0.01 to about 10 percent by weight of an emulsifying agent for said polymer of tetrafluoroethylene, all percentages except those designating the solids concentration of the polymer being based on the weight of the water contained in the aqueous emulsion.

8. An aqueous emulsion of polytetrafluoroethylene consisting essentially of an aqueous dispersion of (a) from about 20 to about 35 percent by weight of a normally solid polytetrafluoroethylene, (b) from about 15 to about 20 percent by weight of highly purified 1,1,2-trifluoro-1,2,2-trichloroethane having a degree of purity such that its infrared spectrophotometric absorption, as determined in a cell of 0.5 mm. thickness, at $5.7\mu$ is less than 0.003 when measured from a base line drawn between shoulders which appear at $5.6\mu$ and $5.93\mu$, and (c) from 0.1 to about 10 percent by weight of an emulsifying agent for the polytetrafluoroethylene, all percentages except those designating the solids concentration of the polytetrafluoroethylene being based on the weight of the water contained in the aqueous emulsion.

9. An aqueous emulsion of a poly(tetrafluoroethylene) consisting essentially of an aqueous dispersion of (a) from about 20 to about 35 percent by weight of a normally solid copolymer of tetrafluoroethylene and at least one comonomer selected from the group consisting of hexafluoropropene and trifluorochloroethylene, (b) from about 15 to about 20 percent by weight of highly purified 1,1,2-trifluoro-1,2,2-trichloroethane having a degree of purity such that its infrared spectrophotometric absorption, as determined in a cell of 0.5 mm. thickness, at $5.7\mu$ is less than 0.003 when measured from a base line drawn between shoulders which appear at $5.6\mu$ and $5.93\mu$, and (c) from 0.01 to about 10 percent by weight of an emulsifying agent for the copolymer, all percentages except those designating the solids concentration of the copolymer being based on the weight of the water contained in the aqueous emulsion.

10. An aqueous emulsion of polytetrafluoroethylene consisting essentially of an aqueous dispersion of (a) from about 20 to about 35 percent by weight of polytetrafluoroethylene, (b) from about 15 to about 20 percent by weight of highly purified 1,1,2-trifluoro-1,2,2-trichloroethane having a degree of purity such that its infrared spectrophotometric absorption, as determined in a cell of 0.5 mm. thickness, at $5.7\mu$ is less than 0.003 when measured from a base line drawn between shoulders which appear at 5.6μ and 5.93μ, and (c) from 0.01 to about 10 percent by weight of an emulsifying agent having a structure selected from the group consisting of $$X(CF_2)_nCOOM, X(CF_2)_nSO_3M$$

and $$X(CF_2)_nCH_2OSO_3M$$

in which X is selected from the group consisting of hydrogen, chlorine and fluorine, M is selected from the group consisting of alkali metals and ammonium, and $n$ is a cardinal number in the range from 6 to 12, all percentages except those designating the solids concentration of the polytetrafluoroethylene being based on the weight of the water contained in the aqueous emulsion.

References Cited
UNITED STATES PATENTS

| | | | |
|---|---|---|---|
| 2,752,331 | 6/1956 | Dittman et al. | 260—87.5 |
| 2,965,595 | 12/1960 | Brinker et al. | 260—87.5 |

SAMUEL H. BLECH, *Primary Examiner.*

MURRAY TILLMAN, *Examiner.*

W. J. BRIGGS, *Assistant Examiner.*

UNITED STATES PATENT OFFICE
CERTIFICATE OF CORRECTION

Patent No. 3,345,317　　　　　　　　　　　　　　October 3, 1967

Juzaemon Hoashi

It is hereby certified that error appears in the above numbered patent requiring correction and that the said Letters Patent should read as corrected below.

Column 3, line 5, for that portion of the formula reading H(( read H( column 6, line 19, for "and" read -- any --; column 7, line 28, for "C'" read -- C. --; column 8, line 44, for "0.1" read -- 0.01 --.

Signed and sealed this 8th day of October 1968.

(SEAL)
Attest:

Edward M. Fletcher, Jr.
Attesting Officer

EDWARD J. BRENNER
Commissioner of Patents